July 22, 1969

H. EHRENS ET AL 3,456,675

PROPORTIONING VALVE

Filed Dec. 27, 1966

INVENTORS
Henry Ehrens
Sidney Weiner

BY

ATTORNEYS

3,456,675
PROPORTIONING VALVE
Henry Ehrens, Bayside, N.Y., and Sidney Weiner, Cresskill, N.J., assignors to Sealed Unit Parts Co., Inc., Allenwood, N.J., a corporation of New York
Filed Dec. 27, 1966, Ser. No. 604,999
Int. Cl. F16k 11/04
U.S. Cl. 137—210    7 Claims

ABSTRACT OF THE DISCLOSURE

A valve for controlling the rate of vapor flow as well as the proportions of vapor and liquid from a storage tank containing liquid and vapor under pressure, comprising a valve body having a mixing chamber. Connected to the mixing chamber is a liquid entrance passage and a vapor entrance passage; said entrance passages having respective axes which are spaced from each other. A fluid exit passage communicates with the mixing chamber. First and second valve seats are provided on the mixing chamber which are adapted to engage first and second valve members. The valve members are connected to a valve stem in such a manner that during a first range of movement of the valve stem, a first flow area between the first valve member and the associated seat increases from zero and a second flow area between the second valve member and the associated seat decreases from a given area greater than the cross-sectional area defined by said first valve seat to an area at least equal to said cross-sectional area. During a second range of movement of the valve stem, the second flow area decreases with respect to the first flow area and finally to a zero area whereby a selective mixture of vapor and liquid flows from the mixing chamber to the fluid exit passage.

---

This invention pertains to fluid valves and more particularly to valves which control the proportions of vapor and liquid passed by the valve.

There are many occasions when it is desirable to transfer a mixture of vapor and liquid from a storage tank to a closed fluid system. One such instance is in the charging of a refrigeration or air conditioning system with refrigerant. The refrigerant is stored as a two-phase fluid (a liquid phase and a gas or vapor phase) in a pressure storage tank. When the refrigeration system is to be recharged it is necessary to introduce a prescribed proportion of liquid and vapor. The proportion is a function of the type of system, the size of the system and the quantity and temperature of the refrigerant in the system just prior to the recharge. With such systems the proportions can range from all liquid and no vapor, to all vapor and no liquid. Even when all vapor is required, it is necessary to control the rate of vapor flow to insure that there is neither a back flow of vapor nor an over pressurizing of the system.

Valves which can control the flow of dissimilar fluids such as liquid and vapor from a common source are known. One such valve is described in U.S. Patent No. 2,365,423. This valve requires the use of three valve elements mechanically operated by a common actuator. One of the valve elements controls the passage of fluid from the valve; the second element, a core valve, controls the flow of only liquid and the third valve element the flow of only vapor. The first and third valve elements comprise a double faced valve disk that is moved reciprocatingly against two valve seats disposed at opposite ends of a chamber. When the disk is moved against one of the valve seats, no fluid can flow from the valve. As soon as the disk is moved intermediate the two valve seats vapor flows from the valve. When the disk is moved against the second valve seat it stops the flow of vapor and mechanically actuates the core valve to permit the passage of liquid. It has also been indicated that for some intermediate position of the disk the passage associated with the second valve seat is not closed and the core valve is open. Thus a mixture of liquid and vapor can be obtained.

However, there is no means for controlling the proportion of vapor and liquid. In addition, there is no means for controlling the rate of flow of all vapor. Finally, it has been found that, by controlling the geometry of various valving elements, the core valve can be delted and mixing can still be obtained, but there is no facility for proportioning or controlling the rate of pure vapor flow.

Accordingly, the invention is directed to a valve for controlling the rate of vapor flow as well as the proportions of vapor and liquid from a storage tank containing liquid and vapor under pressure. The valve includes a valve body having a mixing chamber. Connected to the mixing chamber are a vapor entrance passage, a liquid entrance passage and a fluid exit passage. There are valve seats at the junction of the vapor entrance and fluid exit passages, respectively. A movable valve stem means has connected thereto valve members to cooperate with the valve seats respectively. The valve members are connected to the valve stem means in such a manner that during a first range of movement of the valve stem means the flow area between the valve member and the valve seat associated with the fluid exit passage increases from zero while the flow area between the valve member and the valve seat associated with the vapor entrance passage decreases from an area greater than the cross-sectional area defined by the valve seat to an area at least equal to the cross-sectional area. Accordingly, only vapor will flow through the mixing chamber to the fluid exit passage during this range of movement and the rate of flow of the vapor is proportional to the degree of movement of the valve stem means. Furthermore, during a second range of movement of the valve stem means the flow area associated with the vapor entrance passage decreases with respect to the flow area associated with the fluid exit passage and finally to a zero area.

Accordingly, during the second range of movement, a mixture of vapor and liquid will flow from the mixing chamber to the fluid exit chamber with the proportion of liquid to vapor in the mixture increasing from zero percent at the beginning of the second range of movement to one hundred percent at the end of the second range of movement.

Other objects, features and advantages of the invention will be apparent from the following detailed description when read with the accompanying drawings which show, by way of example and not limitation, proportioning valves in accordance with the invention.

Figure 1:
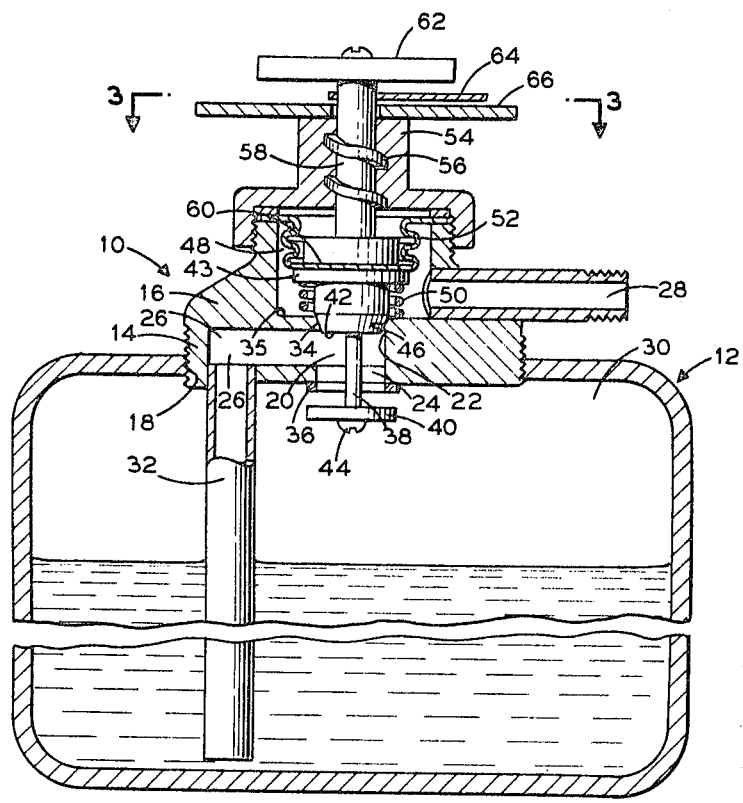
FIGURE 1 shows an axial-sectional view of one embodiment of the proportioning valve fitted to a pressurized fluid storage tank.

Referring now to FIGURE 1, a proportioning valve 10 is shown fitted in pressure tank 12 through the agency of a threaded shaft 14 of valve body 16 sealingly screwed into the threaded collar 18 of tank 12. Pressure tank 12 generally contains a two-phase fluid (a liquid phase and a gas or vapor phase) such as refrigerant under pressure.

The proportioning valve 10 comprises a valve body 16 having a mixing chamber 20. Leading off the mixing chamber 20 is a fluid exit passage 22, a vapor entrance passage 24, and a liquid entrance passage 26. Fluid exit passage 22 is connected to fluid output conduit 28. Vapor entrance passage 24 communicates with the top interior 30 of tank 12. The liquid entrance passage 26 communicates via liquid draw-off tube 32 which extends to approximately the bottom of the interior of tank 12. Valve seat 34 (a beveled collar) is located at the junction of mixing chamber 20 and passage 22; and valve seat 36 (the bottom face of body 16) is located at the junction of mixing chamber 20 and passage 24. A valve stem 38 which is axially movable carries valve member 40 and valve member 42. Valve member 40 in the form of a washer is fixed to the end of stem 38 by screw 44 and cooperates with seat 36 to control the flow of vapor into mixing chamber 20. Valve member 42 in the form of a cylinder with a beveled circumferential edge 46 cooperates with valve seat 34 to control the flow of fluid from mixing chamber 24 to fluid output conduit 28. It should be noted that liquid passage 26 freely (without any obstruction) communicates with chamber 20.

Figure 3:
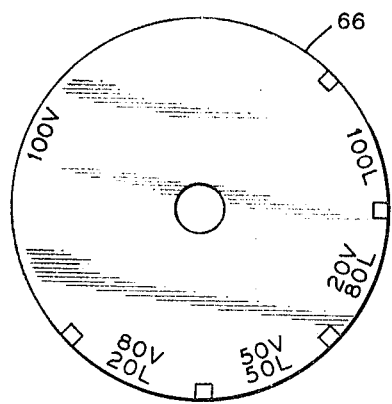
FIGURE 3 is a view taken along the lines 3—3 of FIGURES 1 and 2 and shows a fluid proportioning gauge.

Valve member 42 moves longitudinally in bore 48 and is biased upward by spring 50. Spring 50 is compressed between flange 43 of valve member 42 and abutment 35 of valve body 16. A bellows 52 seals bore 48. Cap 54 threaded onto body 16 has a threaded bore 56 which accepts threaded shaft 58. The bottom 60 of shaft 58 presses against the top of valve member 42 via bellows 52. The top end of shaft 58 carries a manually operable handle 62 and a pointer 64. Pointer 64 cooperates with calibrated scale 66 to indicate the proportions of liquid and vapor in the delivered fluid (see FIG. 3). It should be noted that the pitch of the threading of shaft 58 is such that the valve goes from full open to full closed in no more than one rotation of handle 62.

The operation of the valve will now be described. Assume the valve is closed i.e., valve stem 38 is in its downmost position. Then, passage 22 is sealed by edge 46 of valve member 42 abutting against valve seat 34. Although liquid entrance passage 26 and vapor entrance passage 24 freely communicate with mixing chamber 20, there is no communication between fluid exit passage 22 and chamber 20. As valve stem 28 is withdrawn slightly, passage 22 starts opening. The exit area (the cross sectional area defined by the gap between edge 46 and seat 34) associated with passage 22 is considerably less than the exit area associated with passage 24 (the surface area of the cylinder having a base defined by passage 24 and a height defined by the distance between valve member 40 and seat 36). In addition, the exit area associated with passage 24 is greater than the cross-sectional area of passage 26. Accordingly, only vapor passes from tank 12 via passage 24, mixing chamber 20 and passage 22 to conduit 28. As valve stem 28 is further withdrawn, only vapor is delivered until the exit area associated with passages 22 and 24 are equal. During this range of movement of valve stem 28 the rate of flow of only vapor increases from zero to a maximum value. Beyond this range of movement a second range of movement takes place wherein the exit area of passage 22 becomes greater than that of passage 24. Vapor flow is throttled down and liquid is driven into mixing chamber 20 via passage 26 and drawoff tube 32 by virtue of the differential force exerted on the surface of the fluid in the tank 12. The ratio of liquid to vapor flow increases until passage 24 is completely sealed by valve member 40 abutting valve seat 36. At that time, only liquid flows from mixing chamber 20 via passage 22 to conduit 28.

Figure 2:
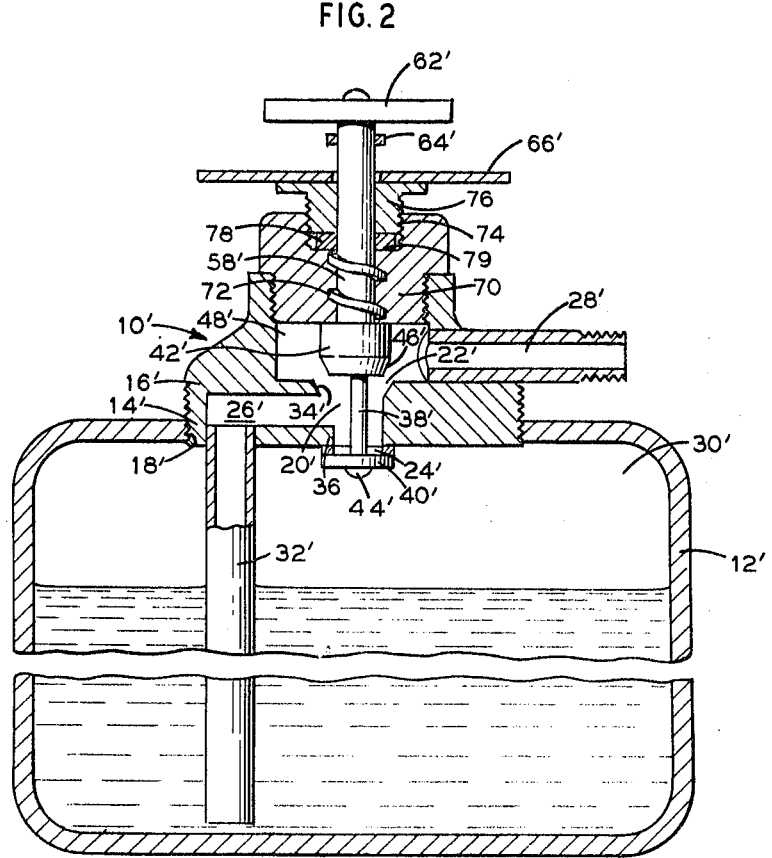
FIGURE 2 shows an axial-sectional view of another embodiment of the proportioning valve of FIGURE 1.

FIGURE 2 shows an alternate embodiment of the valve. Since the valve 10' of FIGURE 2 is similar in most respects to the valve 10 of FIGURE 1 primed reference characters will be used for like elements and only the differences will be discussed. The basic difference resides in replacing the bellows seal 52 with a packing seal. In particular the top of the bore 48' of valve body 16' is provided with a thread to accept the externally threaded cap 70. Cap 70 is provided with a stepped and threaded central bore. The lower portion 72 of the bore is threaded to accommodate the threaded portion of shaft 58'. The upper portion 74 of the bore is threaded to accommodate externally threaded bushing 76 through which passes shaft 58'. Between the bottom end of bushing 76 and abutment 79 is a packing 78 to seal off the bore 48'. Thus shaft 58' is directly connected to valve member 46' and no spring biasing is required.

Valve 10' operates in exactly the same manner as valve 10. Therefore, for the sake of brevity its operation will not be repeated.

While only two embodiments of the invention have been shown and described in detail there will now be obvious to those skilled in the art many modifications and variations which satisfy many or all of the objects of the invention but which do not depart from the spirit thereof as defined by the appended claims.

What is claimed is:

1. A valve for controlling the rate of vapor flow as well as the proportions of vapor and liquid from a storage tank containing liquid and vapor under pressure comprising a valve body adapted to be connected to said tank, said valve body having a mixing chamber, a liquid entrance passage unobstructively and continuously connected to said mixing chamber, a vapor entrance passage connected to said mixing chamber, said liquid entrance passage and said vapor entrance passage having respective axes which are spaced from each other, and a fluid exit passage connected to said mixing chamber, a first valve seat at the junction of said mixing chamber and said fluid exit passage, a second valve seat at the junction of said mixing chamber and said vapor entrance passage, a first valve member movable to engage said first valve seat, a second valve member movable to engage said second valve seat, a movable valve stem means, said valve members being connected to said valve stem means in such a manner that during a first range of movement of said valve stem means a first flow area between said first valve member and said first valve seat increases from zero and a second flow area between said second valve member and said second valve seat decreases from a given area greater than the cross-sectional area defined by said first valve seat to an area at least equal to said cross-sectional area whereby only vapor will flow through said mixing chamber to said fluid exit passage and the rate of vapor flow is proportional to the degree of movement of said valve stem means in the first range of movement, and during a second range of movement of said valve stem means said second flow area decreases with respect to said first flow area and finally to a zero area whereby a mixture of vapor and liquid will flow from said mixing chamber to said fluid exit passage and the proportion of liquid to vapor in said mixture increasing from zero percent at the beginning of the second range of movement to one hundred percent at the end of the second range of movement, and means for moving said movable valve stem means through the first and second ranges of movement.

2. The valve of claim 1 wherein said valve stem means is rectilinearly movable.

3. The valve of claim 2 wherein the means for moving said valve stem means comprises a rotatable threaded shaft in contact with said valve stem means and a matingly threaded support for engaging said shaft whereby a rotation of said shaft can impart rectilinear movement to said valve stem means.

4. The valve of claim 2 wherein said vapor entrance passage is at one end of said mixing chamber, said fluid exit passage is at the other end of said mixing chamber, and said liquid entrance passage is in the side of said mixing chamber intermediate the ends thereof.

5. The valve of claim 2 wherein said liquid entrance passage is always unobstructed irrespective of the position of said valve stem means.

6. The valve of claim 2 wherein said first valve member includes a face portion opposite said mixing chamber, said valve stem means comprises a valve connecting stem extending from said face portion through and beyond said mixing chamber and said second valve member is connected to the portion of said valve connecting stem extending beyond said mixing chamber.

7. The valve of claim 3 further comprising means on said valve body and on said shaft to indicate the degree of rotation of said shaft and thereby the composition of fluid flowing from said fluid exit passage.

References Cited

UNITED STATES PATENTS

| | | | |
|---|---|---|---|
| 164,448 | 6/1875 | Hallett | 137—625.41 |
| 3,021,870 | 2/1962 | Allen | 222—41 X |
| 3,258,160 | 6/1966 | Allen | 222—4 |

ALAN COHAN, Primary Examiner

U.S. Cl. X.R.

62—51; 137—625.4; 222—4